United States Patent
Ployer (10) Patent No.: US 6,801,543 B1
(45) Date of Patent: Oct. 5, 2004

(54) METHOD AND APPARATUS FOR ASSIGNING TIME SLOTS WITHIN A TDMA TRANSMISSION

(75) Inventor: John Scott Ployer, Ottawa (CA)

(73) Assignee: Alcatel, Canada Inc., Kanata (CA)

( * ) Notice: Subject to any disclaimer, the term of this patent is extended or adjusted under 35 U.S.C. 154(b) by 0 days.

(21) Appl. No.: 09/316,439

(22) Filed: May 21, 1999

(51) Int. Cl.⁷ .................................................. H04J 3/16
(52) U.S. Cl. .................... 370/468; 370/442; 370/395.4; 370/322
(58) Field of Search ................................ 370/321, 337, 370/347, 437, 442, 443, 447, 445, 458, 461, 468, 395.4, 395.64, 322, 395

(56) References Cited

U.S. PATENT DOCUMENTS

| | | | | |
|---|---|---|---|---|
| 5,295,140 A | * | 3/1994 | Crisler et al. ............... | 370/94.1 |
| 5,594,727 A | * | 1/1997 | Kolbenson et al. ......... | 370/442 |
| 6,031,827 A | * | 2/2000 | Rikkinen et al. ........... | 370/330 |
| 6,240,079 B1 | * | 5/2001 | Hamalainen et al. ....... | 370/337 |
| 6,282,187 B1 | * | 8/2001 | Evans et al. ................ | 370/347 |

* cited by examiner

Primary Examiner—Steven H. D Nguyen
Assistant Examiner—Thien Tran (57) ABSTRACT

A method and apparatus for assigning time slots in a TDMA transmission maintains a list of available time slots and at least one list of subsequently available time slots with respect to a current frame of a TDMA transmission. The available list and subsequently available list or lists are maintained for each connection supported by the TDMA transmission. The procedure continues by receiving at least one data transport request, which identifies a quantity of data to transmit. It is then determined whether at least one time slot is available for allocation in response to the data transport request. Such a determination is based on the quantity of data to transmit and information in the list of available time slots and information in the list of subsequently available time slots. The procedure continues by allocating at least one time slot for at least one frame when the at least one time slot is available for allocation.

42 Claims, 9 Drawing Sheets

FIG. 4 request queue 70

| client ID | resources needed |
|---|---|
| C1 | 22 |
| C3 | 17 |
| C7 | 1 |
| C6 | 20 |
| C2 | 4 |
| C4 | 15 |
| C1 | 8 |
| C9 | 10 |
| C5 | 7 | resource allocation information 72

| | |
|---|---|
| no. of intervals/allocation | 4 |
| max resources/client/interval | 6 |
| look-ahead | 1 |

FOR CURRENT INTERVAL linked list of resources 74

| next ptr | resource |
|---|---|
| B | A |
| D | B |
| F | C |
| – | D |
| G | E |
| – | F |
| H | G |
| – | H |
| – | I |
| L | J |
| – | K |
| – | L | individual linked lists 76

| 0 | 1 | 2 | 3 | 4 |
|---|---|---|---|---|
| A | C | E | K | J |
| B | F | G |   | L |
| D |   | H |   |   |
|   |   | I |   |   | linked list pointers 78

| list # | hd ptr | tail ptr |
|---|---|---|
| 0 | A | D |
| 1 | C | F |
| 2 | E | I |
| 3 | K | K |
| 4 | J | L |

FOR NEXT INTERVAL linked list of resources 74

| next ptr | resource |
|---|---|
| – | A |
| – | B |
| F | C |
| C | D |
| G | E |
| – | F |
| H | G |
| – | H |
| – | I |
| L | J |
| – | K |
| B | L |
| – |   | individual linked lists 76

| 0 | 1 | 2 | 3 | 4 |
|---|---|---|---|---|
| D | E | K | J | A |
| C | G | B | L |   |
| F | H |   |   |   |
|   | I |   |   |   | linked list pointers 78

| list # | hd ptr | tail ptr |
|---|---|---|
| 4 | A | A |
| 0 | D | F |
| 1 | E | I |
| 2 | K | B |
| 3 | J | L |

METHOD AND APPARATUS FOR ASSIGNING TIME SLOTS WITHIN A TDMA TRANSMISSION

TECHNICAL FIELD OF THE INVENTION

This invention relates generally to communication transmissions and more particularly to time division multiplex access ("TDMA") transmissions.

BACKGROUND OF THE INVENTION

Transmission of data within a communication system is known to utilize one of a plurality of transmission schemes. Such transmission schemes include time division multiplexing ("TDMA"), frequency division multiplexing ("FDMA"), quadrature amplitude modulation ("QAM"), etc. In a communication system that transports data in a TDM manner, each connection, i.e., communication, receives one or more time slots within a frame of time slots. Accordingly, each device transmitting data via a connection monitors the communication system timing to determine when its time slot, or time slots are active. When a time slot is active, the device may transmit its data in its allocated time slot.

In such a communication system, a device may be an end-user such as a telephone, computer, facsimile machine, video telephone, a server, a router, or a private branch exchange ("PBX"). Additionally, switches that comprise a communication system network also transport data utilizing a TDM scheme. For example, in an ATM wireless communication system, an ATM network is coupled to a base station which transceives data over a wireless communication path with network interface units. The data transmitted over the wireless communication path is formatted in accordance with the TDM formatting. As such, each network interface unit that is supporting a communication, i.e., connection, for its plurality of end-users, maintains timing information to determine when the particular time slot for each connection is to occur.

As one can imagine, as the number of connections accessing time slots increases, the management of time slot allocation becomes more complex. In current implementations, a resource manager allocates time slots on a per request basis. The requests, which are generated by an entity which has data to transport and therefore requires a communication path to be established, include the identity of the requesting entity and an amount of bandwidth desired. Based on this information, the resource manager allocates resources, including time slot allocations. The resource manager, at one level or another, monitors the transmission to determine when the parties no longer need the allocated resources. Such a determination may be made by detecting an end of message within data packets transmitted, or some like indication. Upon making this determination, the resource manager flags the resources, including the time slots, as available such that they may be reallocated for another connection.

Due to processing limitations, the resource manager rarely is able to reallocate a time slot in a succeeding frame upon detecting it is available. As such, that particular time slot resource is unused and wasted for a given frame. In addition, as the number of connections managed by the resource manager increases, the processing resources needed to perform the resource management increase accordingly. Therefore, the resource manager performs a substantial amount of processing and, despite the substantial amount of processing, time slot resources are often wasted for one or more frames.

Therefore, a need exists for a method and apparatus that assigns time slots in a TDMA transmission with reduced processing requirements and with minimal loss of time slot resources.

DETAILED DESCRIPTION OF A PREFERRED EMBODIMENT

Generally, the present invention provides a method and apparatus for assigning time slots in a TDMA transmission. The procedure begins by maintaining a list of available time slots and at least one list of subsequently available time slots with respect to a current frame of a TDMA transmission. The available list and subsequently available list or lists are maintained for each connection supported by the TDMA transmission. The procedure continues by receiving at least one data transport request, which identifies a quantity of data to transmit. It is then determined whether at least one time slot is available for allocation in response to the data transport request. Such a determination is based on the quantity of data to transmit and information in the list of available time slots and information in the list of subsequently available time slots. The procedure continues by allocating at least one time slot for at least one frame when the at least one time slot is available for allocation. With such a method and apparatus, time slot allocations within a TDMA transmission may be done with significantly less processing requirements and with minimal loss of time slot resources.

Figure 1:
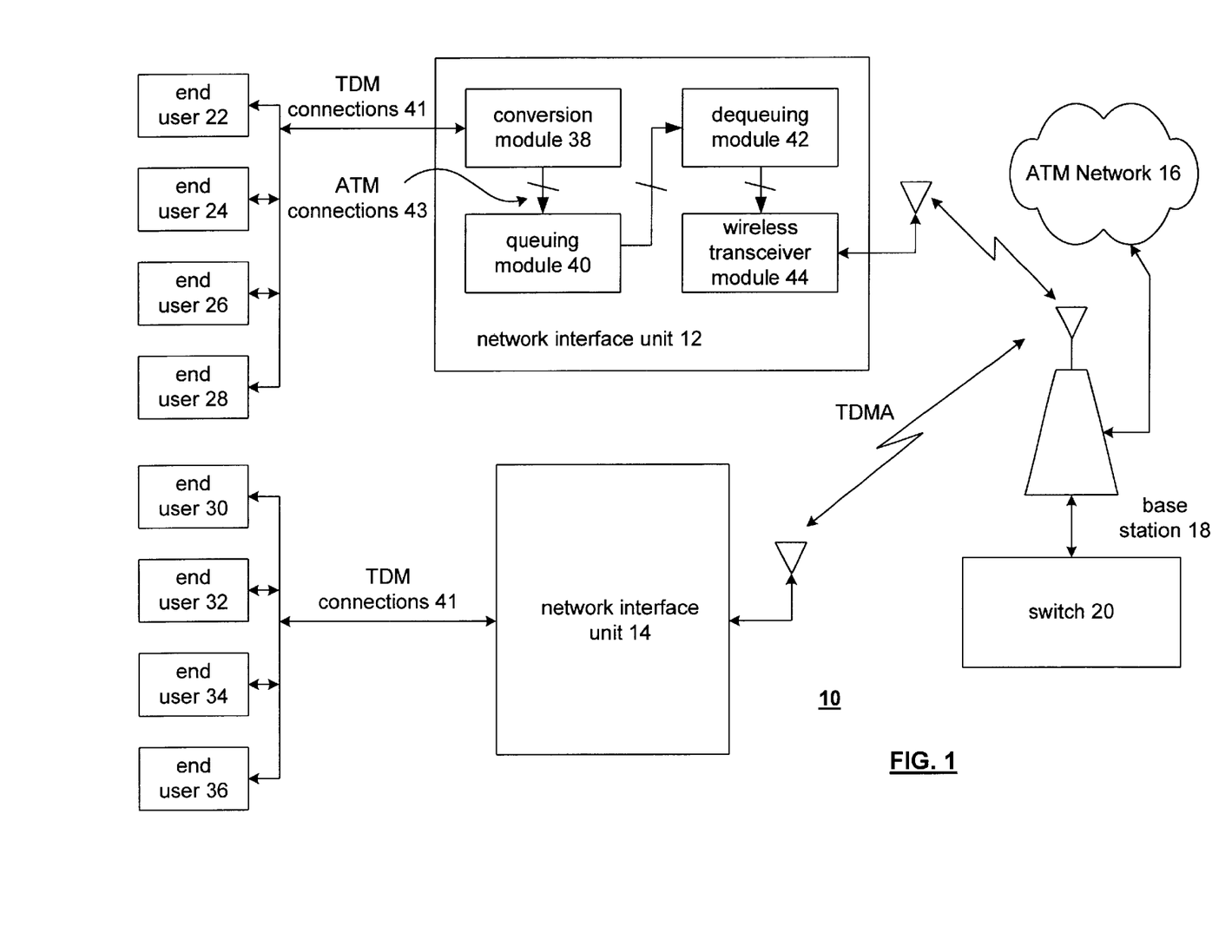
FIG. 1 illustrates a schematic block diagram of a communication system in accordance with the present invention.

The present invention can be more fully described with reference to FIGS. 1 through 11. FIG. 1 illustrates a schematic block diagram of a communication system 10 that includes a plurality of network interface units 12, 14, and asynchronous transfer mode ("ATM") network 16, a base station 18, a switch 20, and a plurality of end-users 22–36. Each of the end-users 22–36 may be an individual end-user such as a personal computer, a telephone, a video phone, a facsimile machine, etc., or the end-users may be servers, routers, and/or private branch exchanges.

The network interface units 12 and 14 each include a conversion module 38, a queuing module 40, a dequeuing module 42, and a wireless transceiver module 44. The conversion module 38 is operably coupled to receive TDM connections 41 from the end-users 22–28 and convert them to ATM connections 43. The techniques for performing such conversions are known, and thus no further discussion will be presented except to further illustrate the teachings of the present invention. TDM connections, raw ATM connections, Ethernet connections, conventional telephone system connections, etc. may couple the end users 22–28 with the network interface unit 12. The queuing module 40 receives the ATM connections 43 and queues them accordingly. At appropriate times, the dequeuing module 42 requests the ATM connections 43 and provides them to the wireless transceiver module 44. The functionality of the queuing module 40 and dequeuing module 42 are discussed in co-pending patent application entitled "Method and Apparatus for Per Connection Queuing of Multicast Transmissions" having an attorney docket number of 1400.9800660.

The wireless transceiver module 44 transceives data in a TDMA fashion with the base station 18. Under the control of switch 20, the base station 18 provides information to the network interface units 12 and 14 as to time slot allocations. A technique used for allocating the time slots will be discussed in greater detail with reference to FIGS. 2 through 11. As one of average skill in the art would readily appreciate, the network interface units 12 and 14 may also utilize the TDMA time slot allocation techniques taught herein to allocate the TDMA connections 41 with the end-users.

The data received by base station 18 from the wireless transceiver module 44 is subsequently routed to the ATM network 16. The ATM network 16 may include a plurality of ATM switches, ATM to frame relay switches, or a variety of other type of internetworking switches. Conversely, data received from the ATM network 16 by base station 18 is provided upstream to the wireless transceiver module 44. Accordingly, for each connection supported by the network interface unit 12 or 14, has at least one allocated time slot within the wireless TDMA path.

Figure 2:
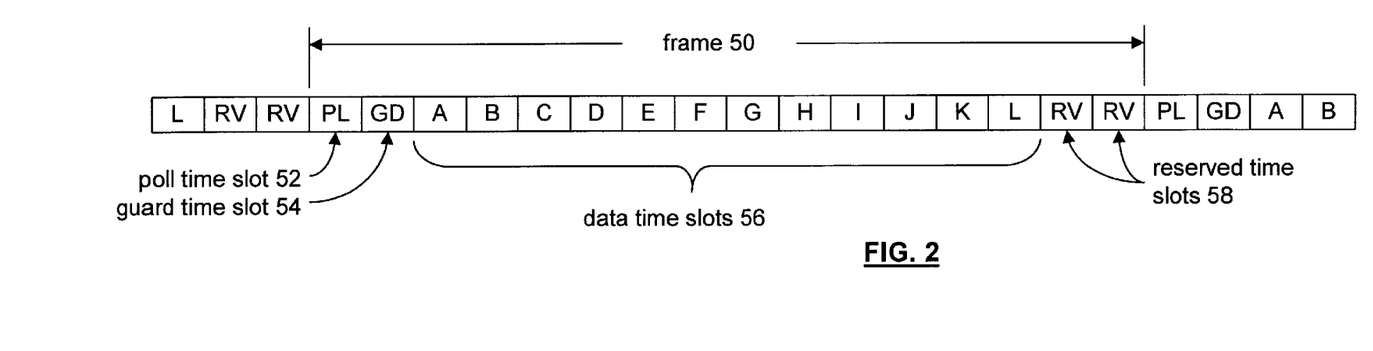
FIG. 2 illustrates a graphical representation of a frame in accordance with the present invention.

FIG. 2 illustrates a graphical representation of a TDMA frame 50 that includes a plurality of time slots. The time slots are shown to include a poll time slot 52, a guard time slot 54, a plurality of data time slots 56, and a plurality of reserved time slots 58. As is known, the poll time slot 52 is used for overhead data such as timing, status, and frequency. The guard time slots are used for compensation because of distance of travel, uncalibrated network interface units entering the network, and for correcting calibration of network interface units already in the network. The reserved time slots 58 are reserved for dedicated connections, i.e., connections that are always present or for some other purpose determined by a network administrator. Data time slots 56 are allocated amongst the requesting users. For the purposes of this example, a requesting user corresponds to a connection and may be an end-user 22–36.

Figure 3:
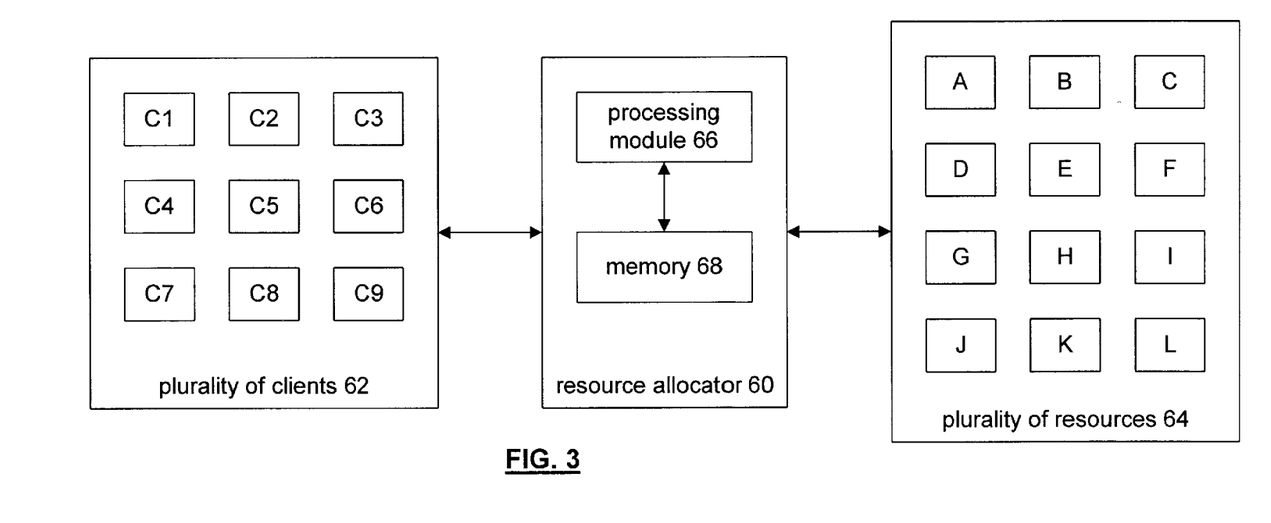
FIG. 3 illustrates a schematic block diagram of a resource allocator in accordance with the present invention.

FIG. 3 illustrates a schematic block diagram of a resource allocator 60 that performs the time slot allocation in accordance with the present invention. The resource allocator 60 includes a processing module 66 and memory 68. The processing module 66 may be a single processing device or a plurality of processing devices. Such a processing device may be a microcontroller, microcomputer, microprocessor, digital signal processor, state machine, logic circuitry, and/or any device that manipulates signals (analog to digital converter) based on operational instructions. The memory 68 may be a single memory device or a plurality of memory devices. Such a memory device may be a read-only memory, random access memory, floppy disk memory, hard drive memory, magnetic tape memory, and/or any device that stores operational instructions. Note that when the processing module implements one or more of its functions using a state machine or logic circuitry, the memory storing the corresponding operational instructions is embedded within the circuitry comprising the state machine or logic circuitry. The operational instructions stored in memory 68 and executed by processing module 66 will be discussed in greater detail with reference to FIGS. 10 and 11 and with reference to the graphical illustrations of FIGS. 4 through 9.

The resource allocator 60 may be included within the switch 20 and/or within the network interface unit 12. Alternatively, the resource allocator 60 may be included within a network administrator (not shown), that may be coupled to the ATM network 16. As shown, the resource allocator 60 is operably coupled to a plurality of clients 62 and to a plurality of resources 64. In a general sense, the resource allocator 60 allocates one or more of the resources 64 to a client 62 for a given number of usage intervals. For example, the usage intervals may correspond to time slots within a TDMA transmission, to a number of operational instructions within a computer system, or further to a predetermined time period.

Figure 4:
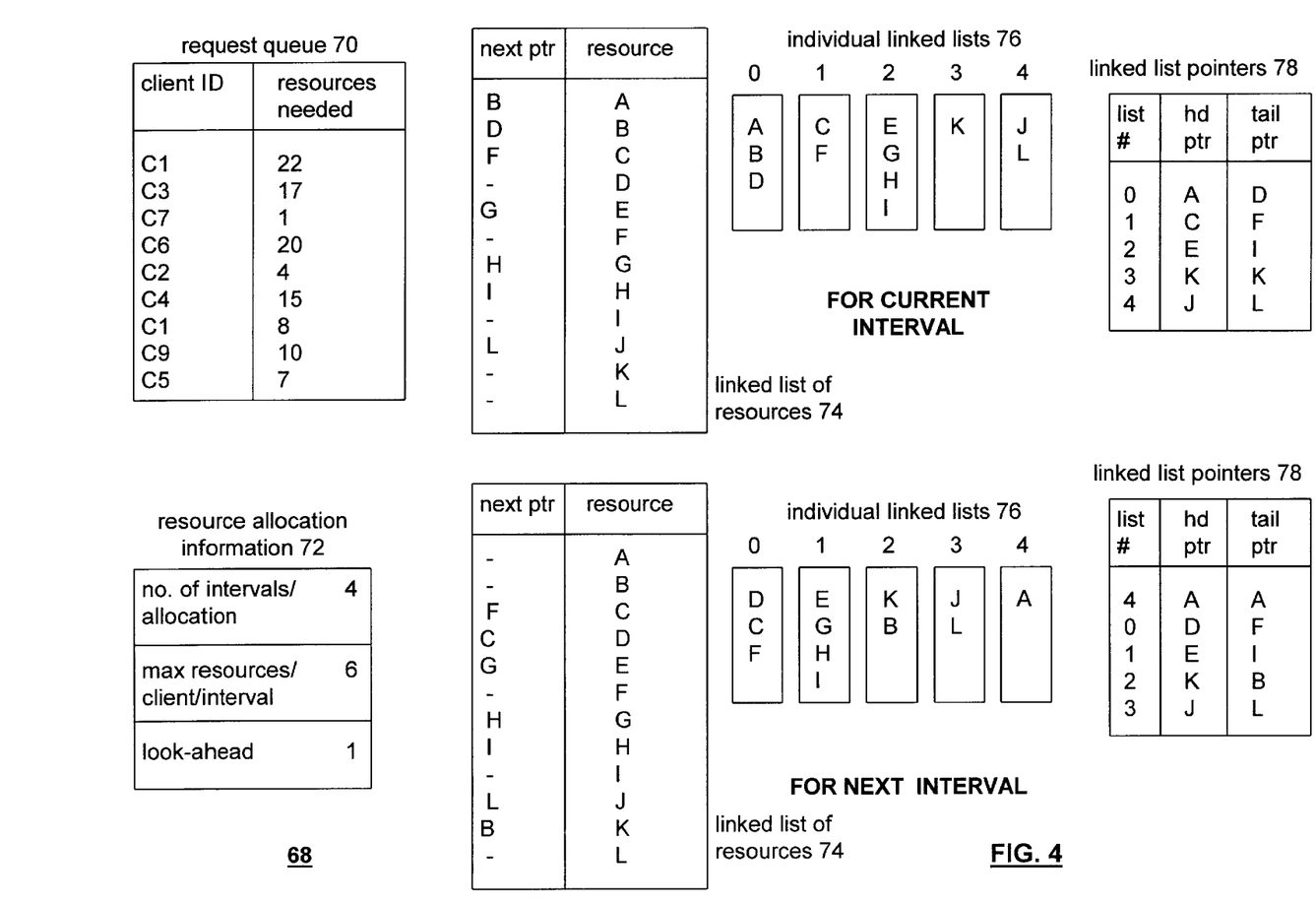
FIGS. 4–9 illustrate a graphical representation of time slot allocations in accordance with the present invention.

FIGS. 4 through 9 illustrate a graphical representation of allocating resources by resource allocator 60. As shown in FIG. 4, the resource allocator 60 includes, within its memory 68, a request queue 70, a resource allocation information memory section 72, a linked list of resources 74, individual linked lists 76, and linked lists pointers 78. Note that the individual linked lists 76 may be separate memory locations, or logical memory assignments that are contained within the linked list of resources 74. Note that FIG. 4 illustrates the linked list of resources 74, the individual linked lists 76, and the linked list pointer 78 for a current interval and a next interval.

For this example, the request queue 70 is shown to include a plurality of clients and the number of resources needed. As shown, client one (C1) requires 22 resources, client 3 requires 17 resources, etc. The resources may correspond to time slots within a TDMA transmission, a number of operational cycles within a computer system, and/or a fixed duration of access to a particular processor or other limited resource. As such, for the duration of this example, assume that the clients identified in the request queue correspond to connections within the communication system of FIG. 1, and the resources correspond to time slots within the frame 50 as shown in FIG. 2.

The resource allocation information 72 indicates the number of intervals per allocation that the resource allocator will assign, the maximum number of resources per client per interval, that may be allocated, and a look ahead value. As shown, the number of intervals per allocation is four, the maximum number of resources per client per interval is six and the look ahead value is one. As one of average skill in the art would appreciate, these values may be increased or decreased depending on the number of resources to be allocated, the number of clients, and other relevant factors in a particular application. For example, in one embodiment, the number of intervals per allocation may be 16, the maximum number of resources per client may be 32 and the look ahead value may be 2. Each of these variables will be discussed in greater detail as the illustrations of FIGS. 4 through 9 are discussed. In addition, the resource allocation information 72 may also include information as to the number of time slots available for allocation per frame. In this example, as shown in FIG. 2, the frame includes 12 data time slots 56.

The example described in conjunction with the Figures assumes a greatly optimized allocation technique. This technique allows time slots to be allocated in increments of one time slot. This may slow down the distribution of the time slots because of the required overhead processing. Therefore, it is understood that the granularity of time slot allocation may be reduced to speed up distribution. For example, if a client requests 17 time slots, but the minimum time slot assignment increment is 6, the client may be assigned 18 time slots. Although distribution speed may be increased, such a semi-optimized approach will likely cause some of the available bandwidth, or resources, to be wasted.

For the current interval, the linked list of resources 74 includes the resources A–L and a corresponding next pointer. With use of the next pointers, the individual linked lists 76 are created. As shown, for resource A, the next pointer is B, for resource B, the next resource D and for resource D, there is no next pointer, which may correspond to an end of list indication. As such, for an individual linked list 0, the linked list includes resources A, B and D in a sequential order. For individual linked list 1, which includes resource C and F, the linked list of resources 74 indicates that resource C has a next pointer of F, and resource F has no next pointer. In addition, the linked list pointers 78 include, for each individual linked list 76, the head pointer and tail pointer. This information is utilized to allocate the time slots within a TDMA transmission as further described with reference to FIGS. 5 through 9.

For the next interval, it is assumed that resource A has been allocated for the next four intervals and resource B has been allocated for the next two intervals but resource D is still available. Accordingly, the individual linked list 0, which corresponds to currently available resources, is updated by appending the resources in linked list 1 of the current interval to the remaining resources within linked list 0 to produce the linked list 0 for the next interval. Accordingly, linked list 0 for the next interval includes resources D, C and F. The linked lists 1, 2, 3 and 4 are updated similarly. As such, linked list 1 indicates which resources will become available on the next interval, linked list 2 indicates which resources will become available within two intervals, linked list 3 indicates which resource will become available in three intervals, and linked list 4 indicates which resources will be available in four intervals.

The look ahead value is utilized to determine how many of the individual linked lists 76 are utilized when determining the resources to allocate. For example, when the look ahead value is 1, as in this example, individual linked lists 0 and 1 are utilized to determine the allocation of resources. This is discussed in greater detail with reference to FIGS. 5 through 9.

Figure 5:
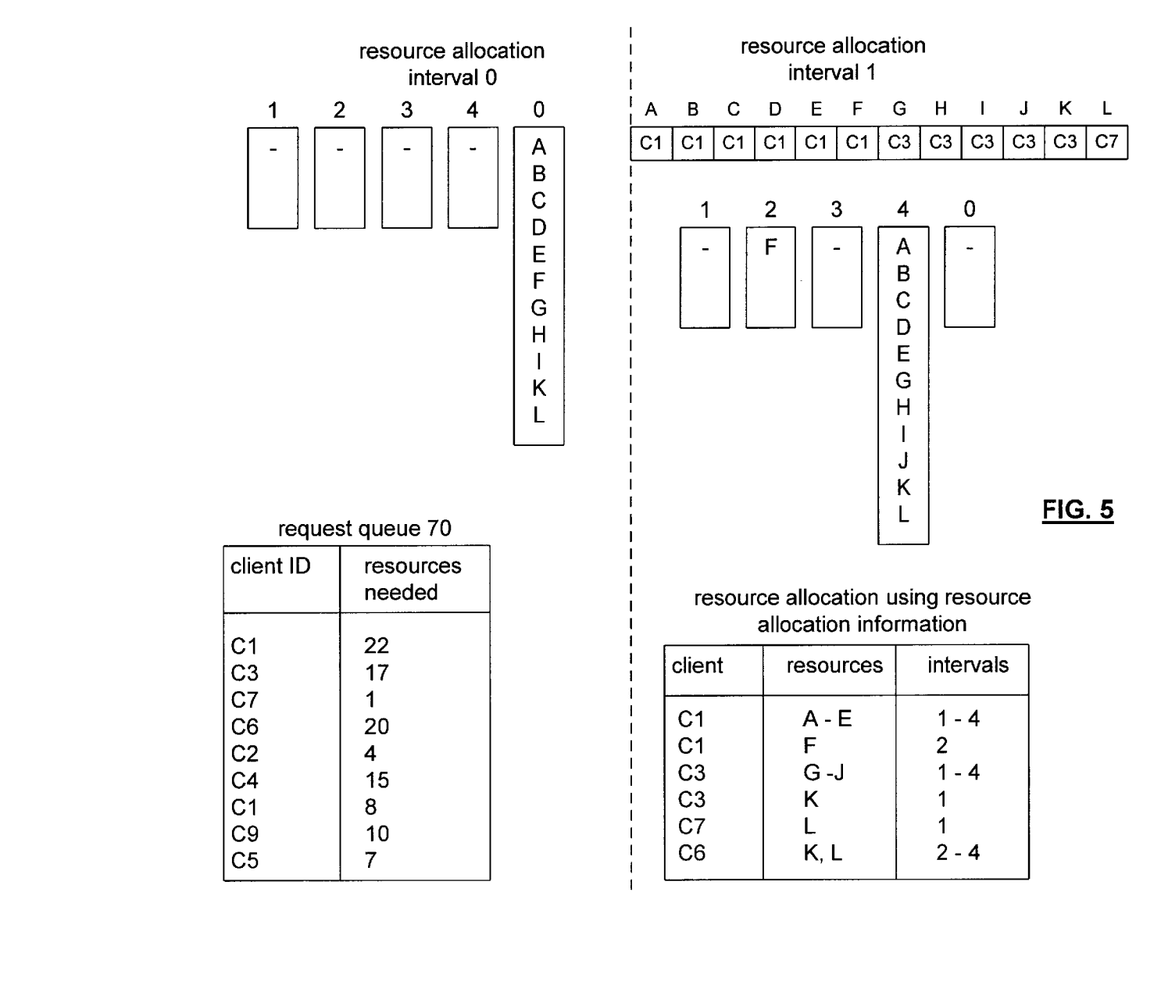

FIG. 5 illustrates a logical representation of the individual linked lists 76 for a resource allocation interval 0. In addition, the request queue 70 is shown to include that client 1 is requesting 22 resources, client 3 is requesting 17, etc. In this example, the request queue 70 is orientated to have a priority in accordance with a first-in, first-out buffer. As one of average skill in the art would appreciate, the prioritization scheme used within request queue 70 may be varied to allow different clients to have greater priority than other clients. As shown, for resource allocation interval 0, all resources, A–L, are available.

The right portion of FIG. 5 corresponds to the first resource allocation interval. At this point, a determination is made as to whether client 1's request can be fully completed. Recall from the resource allocation information, the maximum number of intervals per allocation is four and the maximum number of resources per client per interval is six. Thus for a current allocation, the resource allocator may allocate up to 24 time slots. As such, client 1's request can be completely fulfilled by this allocation interval. If, however, client 1 required more than the 24 resources, the resource allocator would allocate up to 24 to client 1 and then: (1) automatically requeue a request for client 1 for the remaining resources needed; (2) provide a notification to the client that it has been allocated the maximum number such that client may re-request additional resources; or (3) simply discard the remainder of the request with the expectation that client 1 will submit a subsequent request for its remaining requirements.

Since all the resources are available at the initial allocation, client 1 is allocated resources A–E for intervals 1 through 4. This gives client 1 twenty (20) resources. Since client 1 required 22 resources, client is also allocated resource F for intervals 1 and 2. Client 3 is allocated G–J for intervals 1 through 4 and resource K for interval 1. Client 7 is allocated resource L for the first interval and client 6 is allocated resources K and L for intervals 2 through 4. Client 7 can be allocated resources K and L for these intervals because of the look ahead ability of the technique. If the look ahead value were set to a value of 0 rather than 1, resources K and L could not be allocated for the second interval until the next time slot, which is when they become available. Having made these allocations for this interval, each of the clients may transmit their data in the appropriate time slots without loss of time slot allocation.

As each of the resource allocations is made, the plurality of individual linked lists is updated accordingly. At the end of the interval, all of the resources have been allocated, and the linked list 0, which corresponds to currently available resources is empty. Linked list 1, which corresponds to resources that become available on the next resource allocation interval, is also empty, as resources K and L, which would have become available in the next interval, were allocated via the look ahead function. Linked list 2, which corresponds to the resources that will become available in two intervals includes resource F, while linked list 3, which indicates the resources which will be available in three resource allocation intervals is empty. Linked list 4 includes the resources that will become available after the fourth interval. These resources include A, B, C, D, E, G, H, I, J, K, and L.

Note that in the preferred embodiment, allocation of resources K and L using the look ahead function only allows these resources to be allocated for a number of intervals equal to the maximum number of intervals per allocation minus the number of intervals of "look ahead" that must be performed for the allocation. In other words, a resource allocated through the use of the look ahead function cannot be allocated for the maximum number of intervals, and not for a period of intervals that extends beyond the capabilities of the linked lists 76. If, during the resource allocation performed at interval 1, the look ahead function allowed a resource to be allocated for intervals 2–5, an additional linked list would be required to store the resources that would become available after interval 5. Instead, by constraining the allocation to only extend through interval 4, the set of linked lists 76 is sufficient. As an alternate example, if the number of intervals per allocation were 16 and the look ahead were 2, resources within linked list 1 could be allocated for up to 15 intervals while resources in linked list 2 would be allocated for up to 14 intervals.

After each allocation, the linked lists are updated by merely changing the pointer information of the linked list pointers 78. As such, the linked list number is processed in a round robin fashion would update the head pointer and tail pointer with minimal processing requirements. Thus, the individual linked list 3 for an interval becomes the individual linked list 2 for the subsequent interval (with any additions or subtractions due to allocations during the interval). In addition, as shown, when resources are allocated, they are appended to the appropriate linked list. This again requires minimal processing time, but presents the resources in a format that makes their availability simple to determine.

Figure 6:
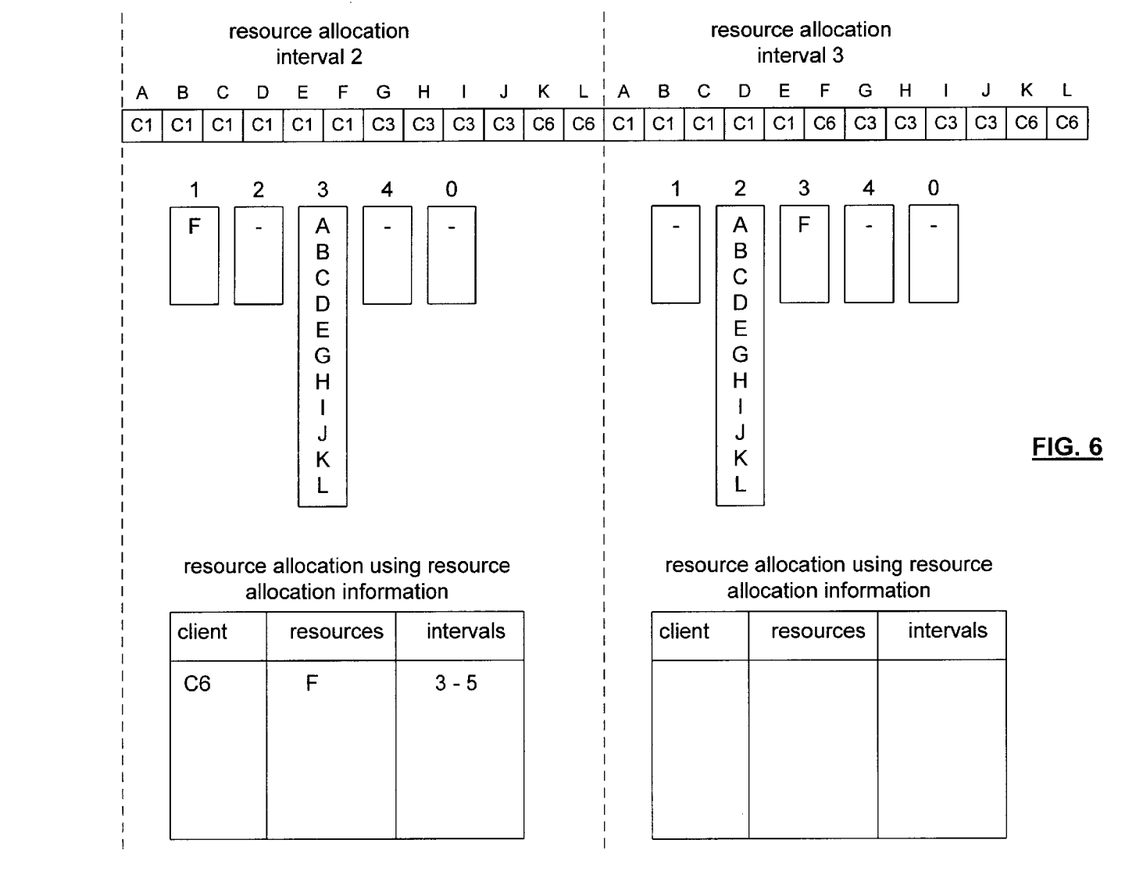

The left portion of FIG. 6 corresponds to allocation interval 2. For this interval, client 6 is allocated resource F for intervals 3 through 5. Through use of the look ahead function, the allocation utilizes the linked list 1 to determine which resources will be available in interval 3. As such, no loss of time slot resources occurs and the look ahead function is utilized. Note that client 6 is allocated resource F for intervals 3 through 5 only.

In the right portion of FIG. 6, no additional resources are available for allocation. This is apparent, as linked lists 0 and 1 are both empty. Therefore, the individual linked lists are updated as described earlier.

Figure 7:
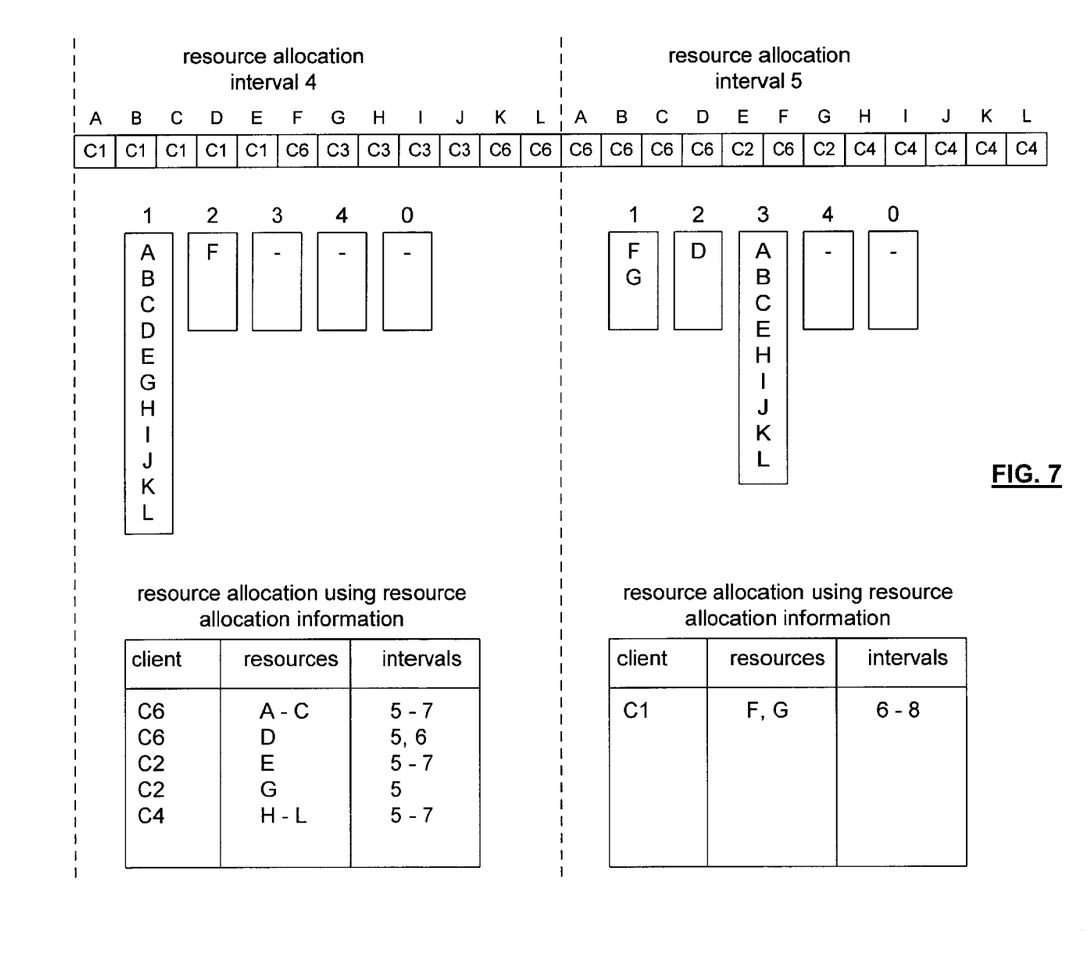

The left portion of FIG. 7 illustrates resource allocation interval 4. As shown, client 1 still retains resources A–E, client 6 has resources F, K, & L, and client 3 has resources G–J. Although no resources are currently available, the look ahead aspect of the present invention allows the resource allocator, at interval 4, to utilize the linked list 1 to allocate resources for interval 5. The resources are allocated as shown.

As shown, client 6 is allocated resources A–C for intervals 5–7 and resource D for intervals 5–6. Such a determination for client 6 is based on the total number of resources it requested. As shown in FIG. 5, client 6 was requesting 20 resources. At the first allocation, client 6 was allocated resources K and L for intervals 2 through 4. As such, client 6 was given 6 resources. At the second allocation interval, client 6 was given resource F for three more intervals thus totaling 9 resources allocated. Thus, client 6 still needed 11 more resources, which are allocated to it as shown.

Other resource allocations at interval 4 are shown to have client 2 receiving resource E for intervals 5 through 7 and resource G for interval 5. Client 4 receives resources H–L for intervals 5 through 7. As stated earlier, the individual linked lists are updated accordingly after each allocation.

On the right portion of FIG. 7, resource allocation interval 5 shows that resources F and G become available at interval 6, as they are in linked list 1. The remaining resources become available in subsequent intervals as shown by being within the appropriate linked list. Because of the look ahead function, client 1's second request is processed, and it is allocated resources F and G for intervals 6 through 8.

Figure 8:
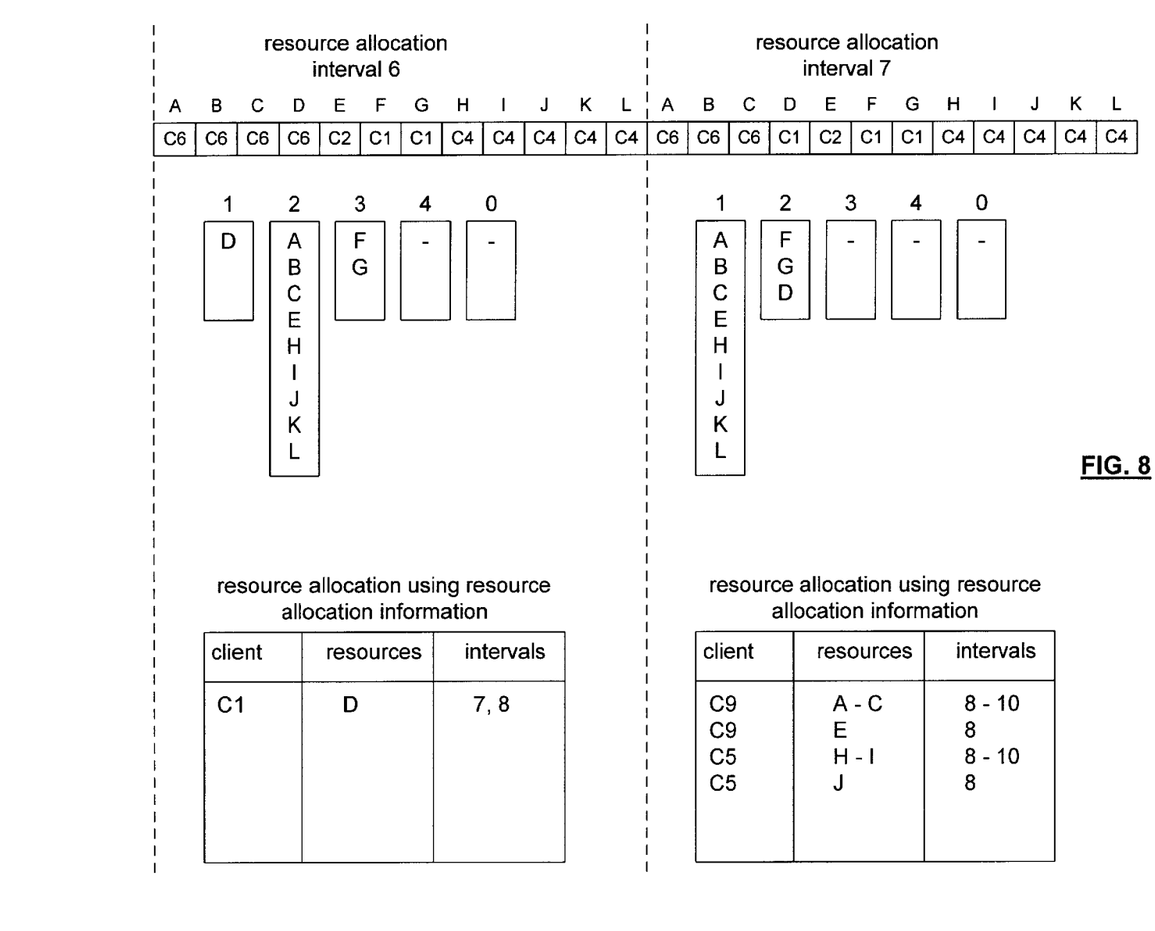

FIG. 8 illustrates, on the left portion, the resource allocation interval 6. At this interval, client 1 is allocated resource D for intervals 7 and 8 and the individual linked lists are updated accordingly.

The right portion of FIG. 8 illustrates the resource allocation interval 7. As shown, client 9 is allocated resources A through C for intervals 8 through 10 and resource E for interval 8. Client 5 is allocated resources H and 1 for intervals 8 through 10 and resource J for interval 8.

Progressing to FIG. 8, resources K and L become available in the interval 8, which is indicated by their presence in linked list 0. At this stage, since all of the client requests have been fulfilled, there are no new resource allocations.

Figure 9:
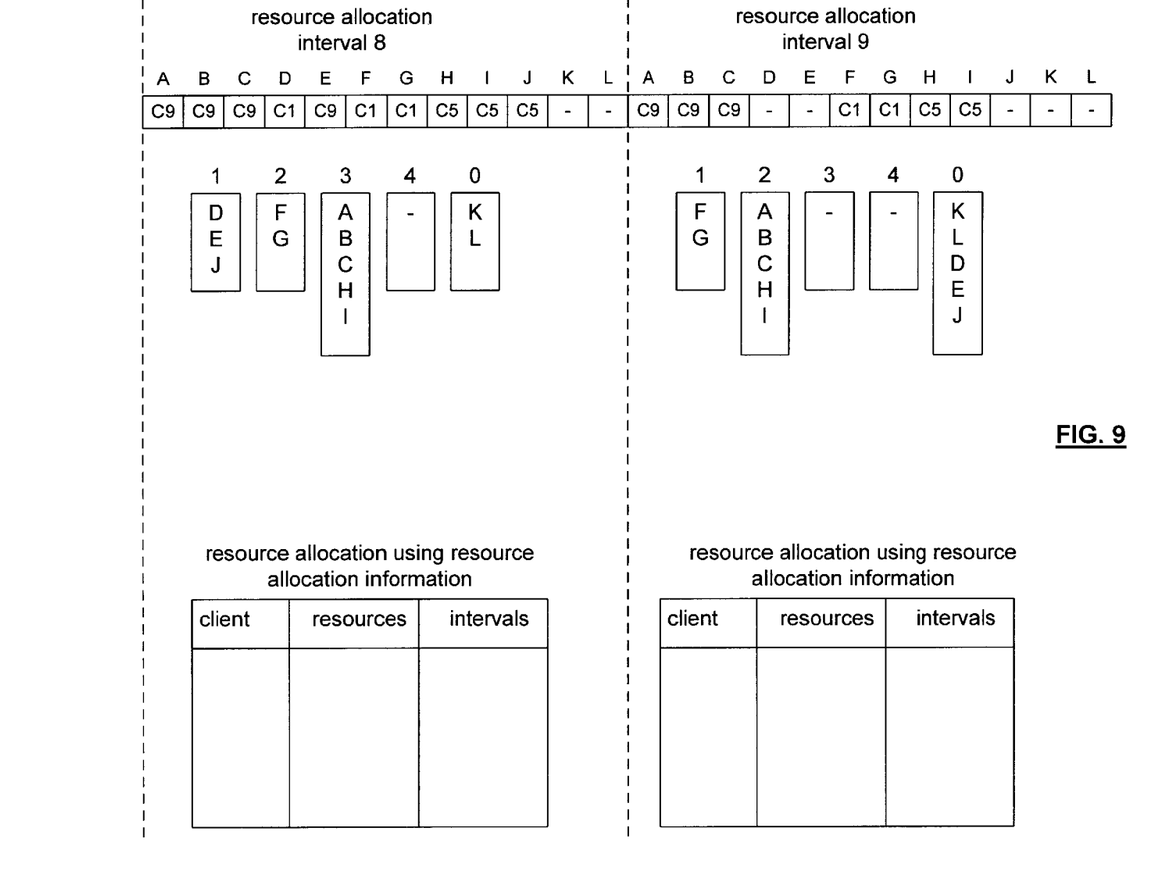

The right portion of FIG. 9 illustrates the resource allocation for interval 9. Once again additional resources become available. Resources D, E and J, which were in linked list 1 at interval 8, become available and are added to linked list 0 for interval 9. The other linked lists are updated accordingly.

As one of average skill in the art can readily determine from the example of FIGS. 4–9, the updating of the linked lists utilizing the linked list of resources 74 and the linked list pointer 78 can be done with minimal processing. When resources are added to linked lists, they are appended to the end of the linked list and the appropriate tail pointer information is updated. In addition, by utilizing a look ahead feature, resources can be allocated for subsequent intervals, helping to ensure that there is no waste of time slot resources.

Figure 10:
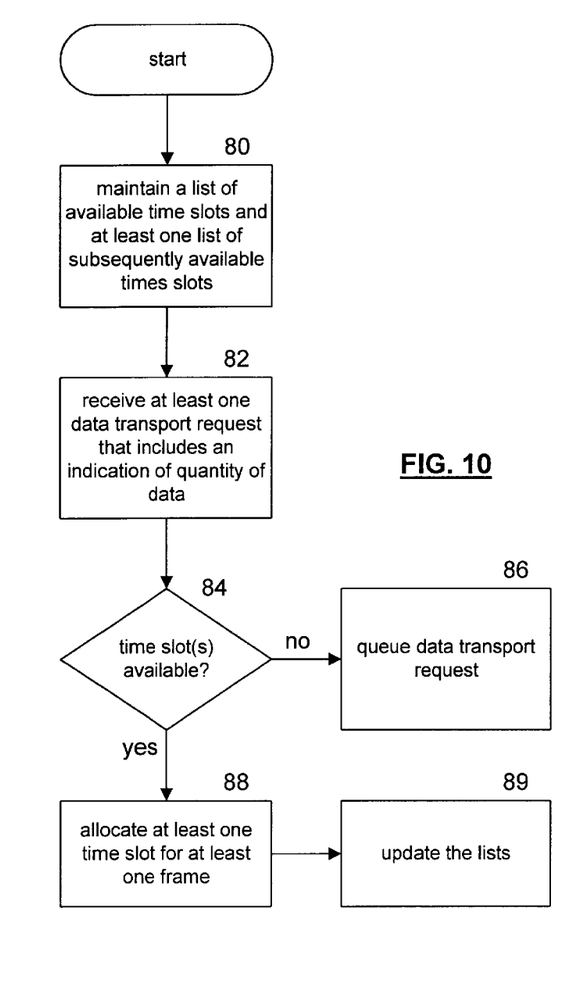
FIG. 10 illustrates a logic diagram of a method for allocating time slots in accordance with the present invention.

FIG. 10 illustrates a logic diagram of a method for assigning time slots in a TDMA transmission in accordance with the present invention. The process begins at step 80 where a list of available time slots and at least one list of subsequently available time slots are maintained. Note that the list of available time slots corresponds to linked list 0 of FIGS. 4 through 9 and the at least one other list of subsequently time slots corresponds to, at a minimum linked list 1 and may further correspond to linked lists 1–4.

The process then proceeds to step 82 where at least one data transport request is received, wherein the data transport request includes an indication of the quantity of data to be transmitted. Based on the quantity of data to be transmitted, the resource allocator determines how many resources need to be allocated to the requesting entity. For example, if a time slot corresponds to 64 kilobytes of data and the requesting entity requires 640 kilobytes of data, the resource allocator determines that 10 time slots are needed and may be allocated in accordance with the teachings hereof.

The process then proceeds to steps 84 where a determination is made as to whether time slots are available. Such a determination is made by utilization of the linked lists. For example, if resources are available in individual linked list 0, the currently available time slot list, resources can be allocated. In addition, if resources are indicated in the lists of subsequently available time slots, which corresponds to linked list 1, these resources may also be allocated for the subsequent frame assuming that the look ahead function described earlier is properly configured.

If time slots are not available, the process proceeds to step 86 where the transport data request is queued. The transport data request is preferably queued in the request queue 70 wherein the client ID and the number of resources is queued.

If, however, time slots are available, the process proceeds to step 88. At step 88, at least one time slot is allocated to the requesting entity for at least one frame. The allocation of time slots is limited by a maximum number of time slots per frame per client and may also be limited by a number of frames per allocation. This information is typically contained within the resource allocation information table 72, which may be made up of individual registers storing each of the relevant variables.

The resource allocator also determines whether the client's requests can be completely fulfilled. If it cannot due to the limitations of the maximum number of intervals per allocation and the maximum resources per client per interval, the resource allocator can queue the remainder of the client's requests giving it a high priority, a low priority or an equivalent priority of other requests. Alternatively, when the client's request cannot be completely fulfilled, the resource allocator may provide notice to the client that his request has not been completely fulfilled and further provide notice as to the amount of the request that has been fulfilled. In another scenario, the resource allocator may simply discard the remainder of the request, relying on the requesting entity to eventually determine that another request should be submitted. In yet another scenario, different levels of priority may be used to differentiate between requests such that remaining portions are either re-queued or discarded. Time limits may also be assigned to requests in the queue such that a request remaining in the queue for a duration beyond the time limit is discarded.

The process then proceeds to step 89 where the individual linked lists are updated. Such updating may be done by concatenating a list of the plurality of lists that corresponds to a frame sequentially succeeding the current frame to the list of currently available time slots. This was discussed earlier with reference to FIGS. 5 through 9. In addition, the linked lists are updated to reflect allocation of time slots and the number of intervals for which the time slots have been allocated.

Figure 11:
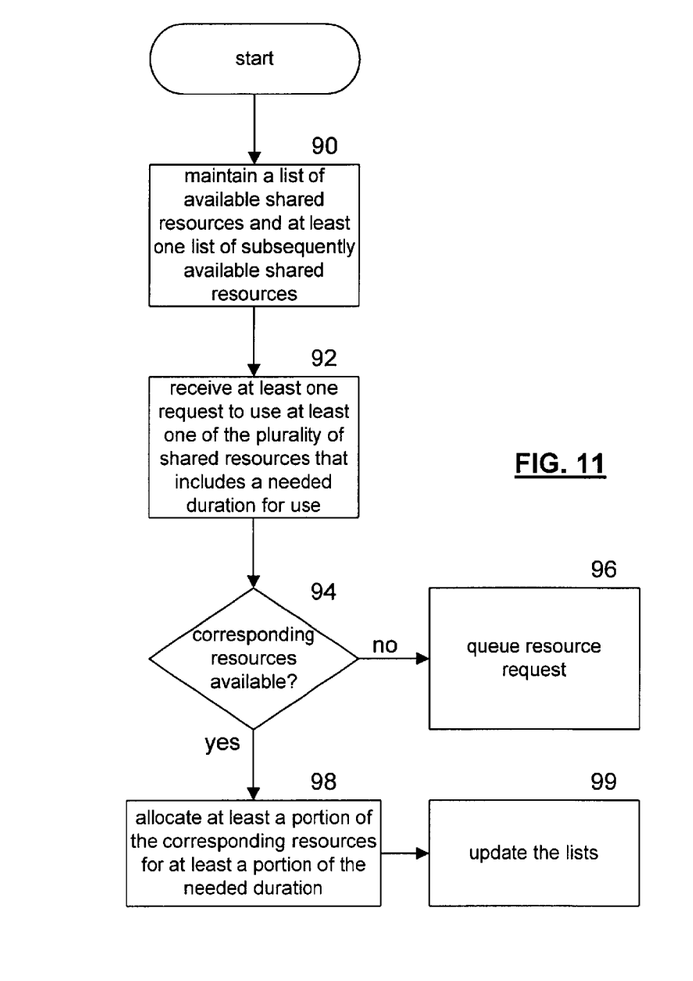
FIG. 11 illustrates a logic diagram of an alternate method for allocating time slots in accordance with the present invention.

FIG. 11 illustrates a logic diagram for accessing a plurality of shared resources. The process begins at step 90 where plurality of lists is maintained, where each list corresponds to a set of shared resources that become available at a given time. Each of the plurality of lists corresponds to resources that become available at a different durational interval. Preferably, the plurality of lists includes a list of available shared resources and a list of subsequently available shared resources. The shared resources may correspond to time slots within a TDMA transmission, processors within a computing system wherein the processors are made available to clients such as to applications for a given number of operating cycles and/or time.

The process then proceeds to step 92 where at least one request to use the shared resources is received. The resource request includes a duration for which the resource is needed.

The process then proceeds to step 94 where a determination is made as to whether corresponding shared resources are available. The determination is based on the plurality of lists, as the lists indicate what resources are currently available and what resources are soon to become available. If no resources are available as identified in the lists, the resource request is queued as shown at step 96. If it is determined that corresponding resources are available, the process proceeds to step 98. At step 98, at least one resource is allocated for at least one durational interval. Having allocated the resource, the lists for each durational interval are updated at step 99 to reflect the allocation and when the resource will next become available.

As described with respect to step 89 of FIG. 10 and was illustrated in FIGS. 4–9, updating can include concatenating the list that corresponds to the durational interval sequentially succeeding the current durational interval to a list of currently available resources. This produces an updated list of available resources for the following interval. The updating may also include updating pointers to the plurality of lists such that a durational interval succeeding the current durational interval becomes the new current durational interval.

As was the case with the example illustrated in FIGS. 4–9, the allocation of the shared resources may be limited by allowing each client a maximum number of resources at each time. This concurrent number of resources limitation may be supplemented with a maximum duration for each allocation.

The preceding discussion has presented a method and apparatus for allocating shared resources, such as time slots within a TDMA transmission. By utilizing a plurality of linked lists that correspond to currently available resources and subsequently available resources, the processing required to allocate these shared resources is substantially reduced. In addition, by utilizing the plurality of linked lists and a pointer list, the list may be readily updated with minimal processing efforts. Still further, allocation of resources are improved since the processing in previous systems was often unable to allocate resources on the interval on which they became available. The present invention simplifies the determination of available resource to a degree that these resources which may have been wasted in prior art systems can be utilized. As one of average skill in the art would readily appreciate, other embodiments may be derived from the teachings of the present invention without deviating the scope of the claims or the spirit of the invention.

What is claimed is:

1. A method for assigned time slots in a TDMA transmission, the method comprises the steps of:
   maintaining, with respect to a current frame of the TDMA transmission, a list of available time slots and at least one list of subsequently available times slots, wherein a frame of the TDMA transmission includes a plurality of times slots;
   receiving at least one data transport request, wherein the at least one data transport request includes quantity of data to transmit;
   determining whether at least one time slot is available to be allocated in response to the data transport request, wherein the determining is based on quantity of data to transmit and information in at least a portion of the lists of available time slots and subsequently available time slots; and
   when the at least one time slot is available to be allocated, allocating the at least one time slot for at least one frame.

2. The method of claim 1, wherein allocation of time slots is limited based on a maximum number of time slots for allocation to a client per frame.

3. The method of claim 2, wherein allocation of time slots is limited based on a maximum number of frames per time slot allocation.

4. The method of claim 3, wherein when the data transport request cannot be completely accommodated by currently available time slots:
   allocating available time slots to accommodate a first portion of the data transport request; and
   queuing a second portion of the data transport request in a request queue.

5. The method of claim 3, wherein when the data transport request cannot be completely accommodated by currently available time slots:
   allocating available time slots to accommodate a first portion of the data transport request; and
   notifying a source of the data transport request that a second portion of the data transport request was not fulfilled.

6. The method of claim 3, wherein when it is determined that time slots are not available to satisfy the data transport request, queuing the data transport request.

7. The method of claim 3 further comprises updating, for next frame of TDMA transmission, the lists of available time slots and subsequently available times slots.

8. The method of claim 7, wherein the at least one list of subsequently available time slots includes a plurality of lists, wherein each of the plurality of lists corresponds to sequentially forthcoming frames of the TDMA transmission.

9. The method of claim 8, wherein updating includes concatenating a list of the plurality of lists that corresponds to a frame sequentially succeeding the current frame to the list of available time slots, wherein the concatenated list corresponds to an updated list of available time slots.

10. The method of claim 8, wherein updating includes updating the plurality of lists to reflect allocation of time slots in response to the data transport request.

11. The method of claim 8, wherein updating includes updating pointers to the plurality of lists to correspond to a frame sequentially succeeding the current frame, such that the frame sequentially succeeding the current frame becomes a new current frame.

12. The method of claim 3, wherein allocating time slots is based on a minimum number of time slots per frame for a maximum number of frames per allocation and the quantity of data.

13. The method of claim 3, wherein allocating time slots is based on a maximum number of time slots per frame up to a maximum number of time slots per allocation and the quantity of data.

14. A method for accessing a plurality of shared resources, the method comprises the steps of:
 maintaining a plurality of lists, wherein each of the plurality of lists corresponds to a set of shared resources that become available at a given time and wherein the plurality of lists each correspond to a different durational interval;
 receiving a request to use at least one of the plurality of shared resources, wherein the request includes a duration that the at least one of the plurality of shared resources is needed;
 determining whether corresponding resources are available, wherein determining is based on the duration and information in at least a portion of the plurality of lists; and
 when corresponding resources are available to be allocated, allocating the at least a portion of the corresponding resources for at least a portion of the duration.

15. The method of claim 14, wherein allocating further comprises limiting allocation of resources based on a maximum number of resources for concurrent allocation to a client and based on a maximum duration per resource allocation.

16. The method of claim 15 further comprises updating the plurality of lists for each durational interval.

17. The method of claim 16, wherein updating includes concatenating a list of the plurality of lists that corresponds to a durational interval sequentially succeeding the current durational interval to a list of currently available resources, wherein the concatenated list corresponds to an updated list of available resources.

18. The method of claim 16, wherein updating includes updating the plurality of lists to reflect allocation of resources in response to the request.

19. The method of claim 16, wherein updating includes updating pointers to the plurality of lists such that a durational interval sequentially succeeding the current durational interval becomes a new current durational interval.

20. A time slot management module for a TDMA transmission system comprises:
 a processing module; and
 memory operably coupled to the processing module, wherein the memory includes operational instructions that cause the processing module to (a) maintain, with respect to a current frame of the TMDA transmission, a list of available time slots and at least one list of subsequently available time slots, wherein a frame of the TDMA transmission includes a plurality of time slots; (b) determine, in response to at least one data transport request that includes a quantity of data to transmit, whether at least one time slot is available to be allocated, wherein determining is based on the quantity of data to transmit and information in at least a portion of the lists of available time slots and subsequently available time slots; and (c) when the at least one time slot is available to be allocated, allocate the at least one time slot for at least one frame.

21. The time slot management module of claim 20, wherein the memory further comprises operational instructions that cause the processing module to limit allocation of time slots based on a maximum number of time slots for allocation to a client per frame.

22. The time slot management module of claim 21, wherein the memory further comprises operational instructions that cause the processing module to limit allocation of time slots based on a maximum number of frames per time slot allocation.

23. The time slot management module of claim 22, wherein the memory further comprises operational instructions that cause the processing module to:
 when the data transport request cannot be completely accommodated by currently available time slots:
  allocate available time slots to accommodate a first portion of the data transport request; and
  queue a second portion of the data transport request in a request queue.

24. The time slot management module of claim 22, wherein the memory further comprises operational instructions that cause the processing module to:
 when the data transport request cannot be completely accommodated by currently available time slots:
  (available here includes look-ahead time slots . . . ?)
  allocate available time slots to accommodate a first portion of the data transport request; and
  notify a source of the data transport request that a second portion of the data transport request was not fulfilled.

25. The time slot management module of claim 22, wherein the memory further comprises operational instructions that cause the processing module to queue the data transport request when it is determined that time slots are not available to satisfy the data transport request.

26. The time slot management module of claim 22, wherein the memory further comprises operational instructions that cause the processing module to update, for a next frame of TDMA transmission, the lists of available time slots and subsequently available times slots.

27. The time slot management module of claim 22, wherein the at least one list of subsequently available time slots includes a plurality of lists, wherein each of the plurality of lists corresponds to sequentially forthcoming frames of the TDMA transmission.

28. The time slot management module of claim 27, wherein each of the plurality of lists is structured as a linked list, wherein time slots that become available within a particular frame are included in a linked list corresponding to the particular frame.

29. The time slot management module of claim 28, wherein the memory further comprises operational instructions that cause the processing module to update the list of available time slots by concatenating a linked list that corresponds to a frame sequentially succeeding the current frame to a linked list storing currently available time slots.

30. The time slot management module of claim 28, wherein the memory further comprises operational instructions that cause the processing module to update the plurality of linked lists to reflect allocation of time slots in response to the data transport request.

31. The time slot management module of claim 28, wherein the memory further comprises operational instructions that cause the processing module to update the plurality of linked lists by updating pointers to the plurality of linked lists to correspond to a frame sequentially succeeding the current frame, such that the frame sequentially succeeding the current frame becomes a new current frame.

32. A resource management module comprises:

a processing module; and memory operably coupled to the processing module, wherein the memory includes operational instructions that cause the processing module to (a) maintain a plurality of lists, wherein each of the plurality of lists corresponds to a set of shared resources that become available at a given time and wherein each of the plurality of lists corresponds to a different durational interval; (b) determine, in response to a request to use at least one of the plurality of shared resources that includes a duration, whether corresponding resources are available, wherein determining is based on the duration and information in at least a portion of the plurality of lists; and (c) when corresponding resources are available to be allocated, allocate at least a portion of the corresponding resources for at least a portion of the duration.

33. The resource management module of claim 32, wherein the memory further comprises operational instructions that cause the processing module to limit allocation of resources based on a maximum number of resources for concurrent allocation to a client.

34. The resource management module of claim 32, wherein the memory further comprises operational instructions that cause the processing module to limit allocation of resources based on a maximum duration per resource allocation.

35. The resource management module of claim 34, wherein the memory further comprises operational instructions that cause the processing module to:

when the request cannot be completely accommodated by currently available resources:
allocate available resources to accommodate a first portion of the request; and
queue a second portion of the request in a request queue.

36. The resource management module of claim 34, wherein the memory further comprises operational instructions that cause the processing module to:

when the request cannot be completely accommodated by currently available resources:
allocate available resources to accommodate a first portion of the request; and
notify a source of the request that a second portion of the request was not fulfilled.

37. The resource management module of claim 34, wherein the memory further comprises operational instructions that cause the processing module to queue the request when it is determined that resources are not available to satisfy the request.

38. The resource management module of claim 34, wherein the memory further comprises operational instructions that cause the processing module to update the plurality of lists for each durational interval.

39. The resource management module of claim 32, wherein each of the plurality of lists is structured as a linked list, wherein resources that become available within a particular durational interval are included in a linked list corresponding to the particular durational interval.

40. The resource management module of claim 39, wherein the memory further comprises operational instructions that cause the processing module to update a list corresponding to currently available resources by concatenating a linked list that corresponds to a durational interval sequentially succeeding the current durational interval to a linked list storing currently available resources.

41. The time slot management module of claim 39, wherein the memory further comprises operational instructions that cause the processing module to update the plurality of linked lists to reflect allocation of resources in response to the request.

42. The time slot management module of claim 39, wherein the memory further comprises operational instructions that cause the processing module to update the plurality of linked lists by updating pointers to the plurality of linked lists to correspond to a durational interval sequentially succeeding the current durational interval, such that the durational interval sequentially succeeding the current durational interval becomes a new current durational interval.

* * * * *